(No Model.)
T. P. ANDERSON, Jr.
HUB CAP.
No. 418,149. Patented Dec. 31, 1889.
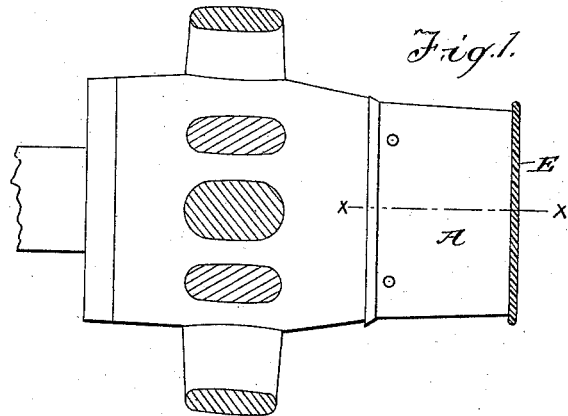
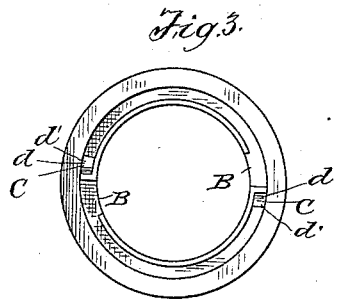
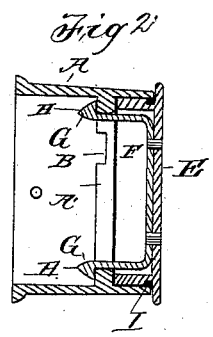
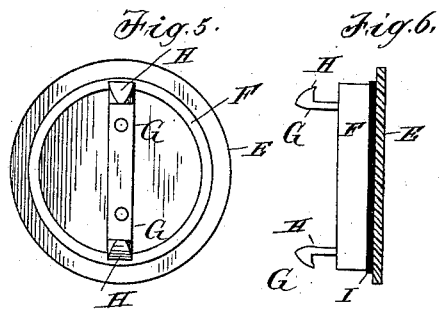
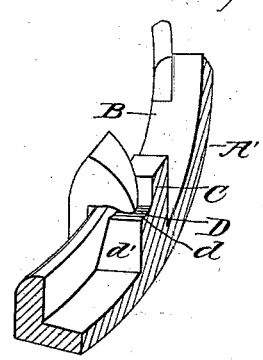
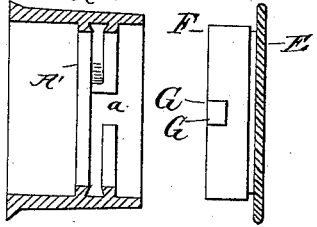
WITNESSES:
H. E. Holmes
L. V. Harwood
INVENTOR
Theodore P. Anderson Jr.
BY
Frederick W. Crocker
ATTORNEY

UNITED STATES PATENT OFFICE.

THEODORE P. ANDERSON, JR., OF HARTWELL, OHIO.

HUB-CAP.

SPECIFICATION forming part of Letters Patent No. 418,149, dated December 31, 1889.

Application filed August 30, 1889. Serial No. 322,416. (No model.)

*To all whom it may concern:*

Be it known that I, THEODORE P. ANDERSON, Jr., a citizen of the United States, residing at Hartwell, in the State of Ohio, have invented a certain new and useful Improvement in Combined Hub Band and Cap, of which the following is a specification.

My invention relates to improvements in bands and caps attached to the outer end of the hubs of wheels used on buggies, carriages, and other vehicles.

The object of my invention is to so construct combined bands and caps that after the wheel is placed on the axle the band can be closed by the cap, which is quickly and readily secured thereto, preventing the loss of the nut, holding the wheel on the axle, the dropping of oil or other lubricating substances from the hub, and the working of dust or dirt between the hub and the axle.

Reference is to be had to the accompanying drawings, forming a part of this specification, in which similar letters of reference indicate corresponding parts in all the figures.

Figure 1 is a side elevation view of a hub, showing my band and cap attached thereto. Fig. 2 is a cross-sectional view taken on line $x$ $x$, Fig. 1. Fig. 3 is a plan view showing locking-flange in the inside of band. Fig. 4 is an enlarged sectional view of locking-flange. Fig. 5 is a plan view of under side of cap with spring attached. Fig. 6 is a side view of cap, showing the spring-catches; and Fig. 7 is a view showing a modification of my invention.

The band A, Fig. 1, is made of any suitable material, and has cast or otherwise placed upon the inner walls thereof a circular flanged rib A', Fig. 4, provided with openings B B, directly opposite one another. At two of the opposite diagonal ends of the rib A' (formed by openings B B) are stops or lugs C C, formed with recesses D D in their upper edges, the faces $d$ $d$ of which are slightly concaved and approached by inclined sides $d'$ $d'$.

The cap E, Fig. 1, is constructed of any suitable material, and has attached to its under side, within the rim F, a spring G, Figs. 5 and 6, its opposite ends being at right angles thereto. The ends of the spring G are provided with heads or catches H. The cap E is milled upon its edge to more easily secure its adjustment, and the rim F is provided with a groove I, in which a band of rubber or other suitable packing is placed to tightly hold the cap in position and prevent its rattling.

In the modification shown in Fig. 7 the band A is cast with flange A' upon its inner walls and a wedge-shaped recess $a$ at the opposite sides of said inner walls. The cap E (in the place of springs) is provided at opposite sides upon its rim F with wedge-shaped lugs G G, and when placed in position within the band the lugs G G are caused to pass into the recesses $a$, holding the cap E snugly and securely to the band.

The manner of using my invention is as follows: After the wheel is placed upon the axle and the nut holding the same is adjusted the cap E is placed in the band A in such a position that the heads or catches H of spring G pass through openings B B, directly opposite one another, and as it is turned the indentations on the under side of the catches H H follow the flange of rib A', coming in contact with the inclined sides $d'$ $d'$ of lugs C C, causing the spring heads or catches H to be forced into a strained condition until they reach the concaved faces $d$ $d$ on lugs C C, when they are released, and, owing to the elasticity of spring G, snap into place against the upper portion of lugs C, which prevents the catches moving any farther in the direction turned, Fig. 4, holding the cap securely to the band.

What I claim, and desire to secure by Letters Patent, is—

1. In a combined hub band and cap, the band A, provided upon its inner wall with a flanged rib A', divided into two sections by openings B B, and stops or lugs C C at the opposite diagonal ends thereof, said lugs being formed with recesses D D, with slightly-concaved surfaces $d$ $d$, for the purpose substantially as shown and described.

2. In a combined hub band and cap, the band A, provided upon its inner wall with a flanged rib A', divided into two sections by openings B B, and stops or lugs C C at two of the opposite diagonal ends thereof, said lugs being formed with recesses D D, with concaved surfaces $d$ $d$ and inclined sides $d'$ $d'$, for the purpose substantially as shown and described.

3. In a combined hub band and cap, the cap E, milled upon its edge and provided with a groove I in its rim for placing a band of rubber or other packing, springs G, with heads or catches H, band A, provided upon its inner walls with a flanged rib A', divided into two sections by openings B B, and stops or lugs C C at two of the opposite diagonal ends thereof, said lugs being formed with recesses D D, with concaved surfaces $d\,d$ and inclined sides $d'\,d'$, for the purpose substantially as shown and described.

THEO. P. ANDERSON, JR.

Witnesses:
 THOS. L. CURLEY,
 JOHN ROGERS.